Feb. 11, 1941.  W. M. SPRENG  2,231,229
SPRAYING MACHINE
Filed Sept. 12, 1938  4 Sheets-Sheet 1
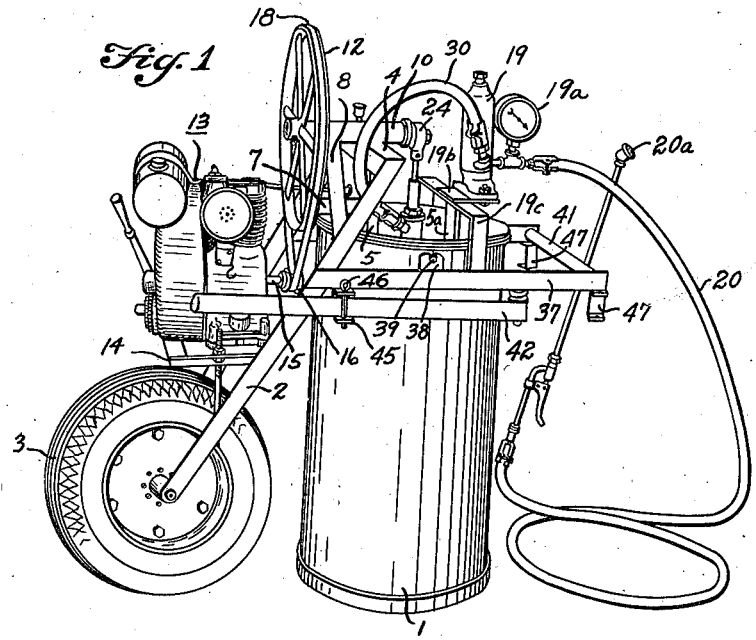
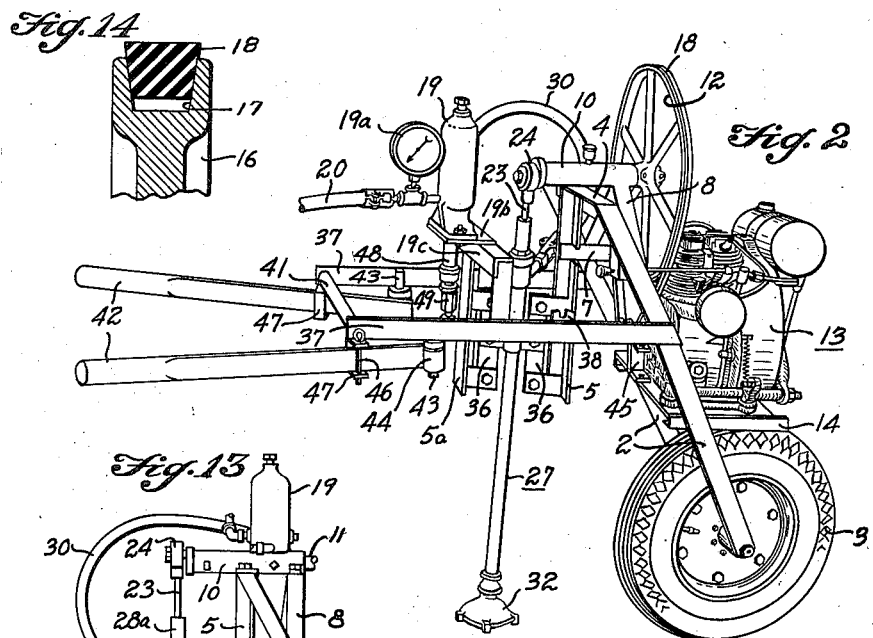
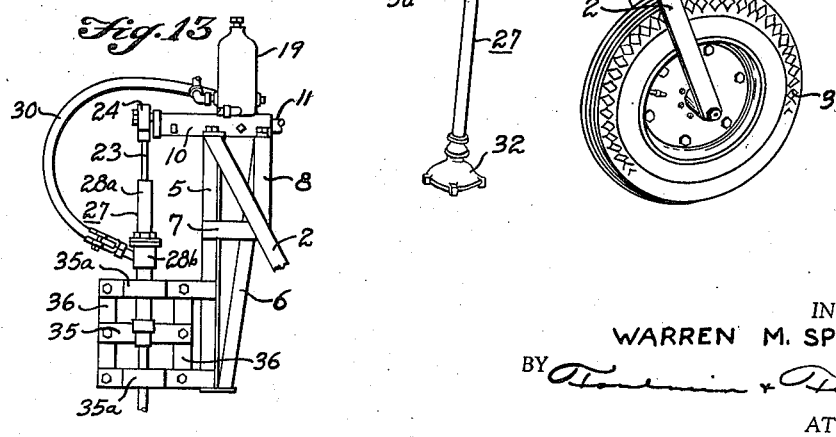
INVENTOR.
WARREN M. SPRENG
BY
ATTORNEYS

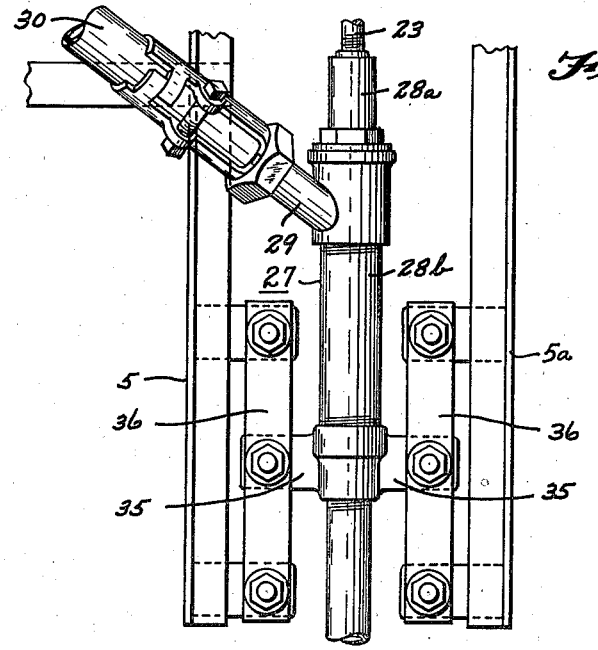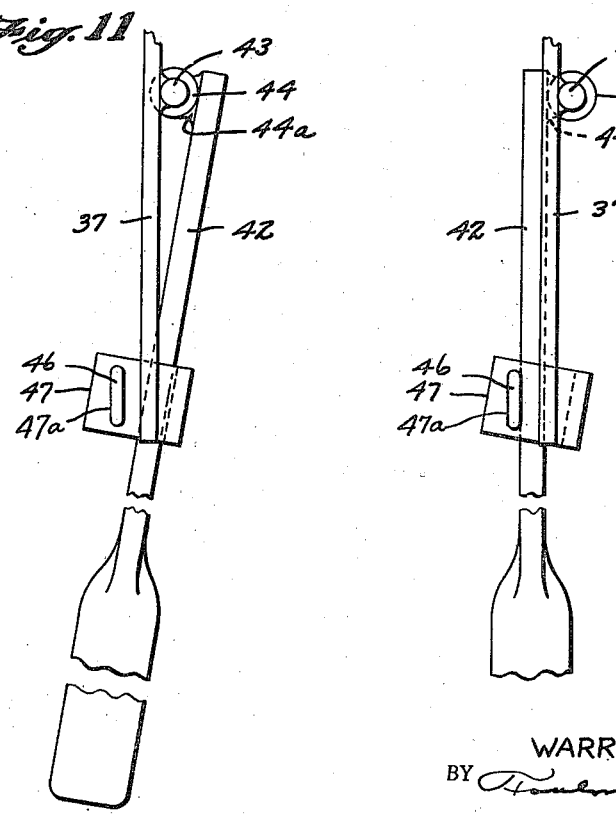
INVENTOR.
WARREN M. SPRENG

Feb. 11, 1941.    W. M. SPRENG    2,231,229
SPRAYING MACHINE
Filed Sept. 12, 1938    4 Sheets-Sheet 3
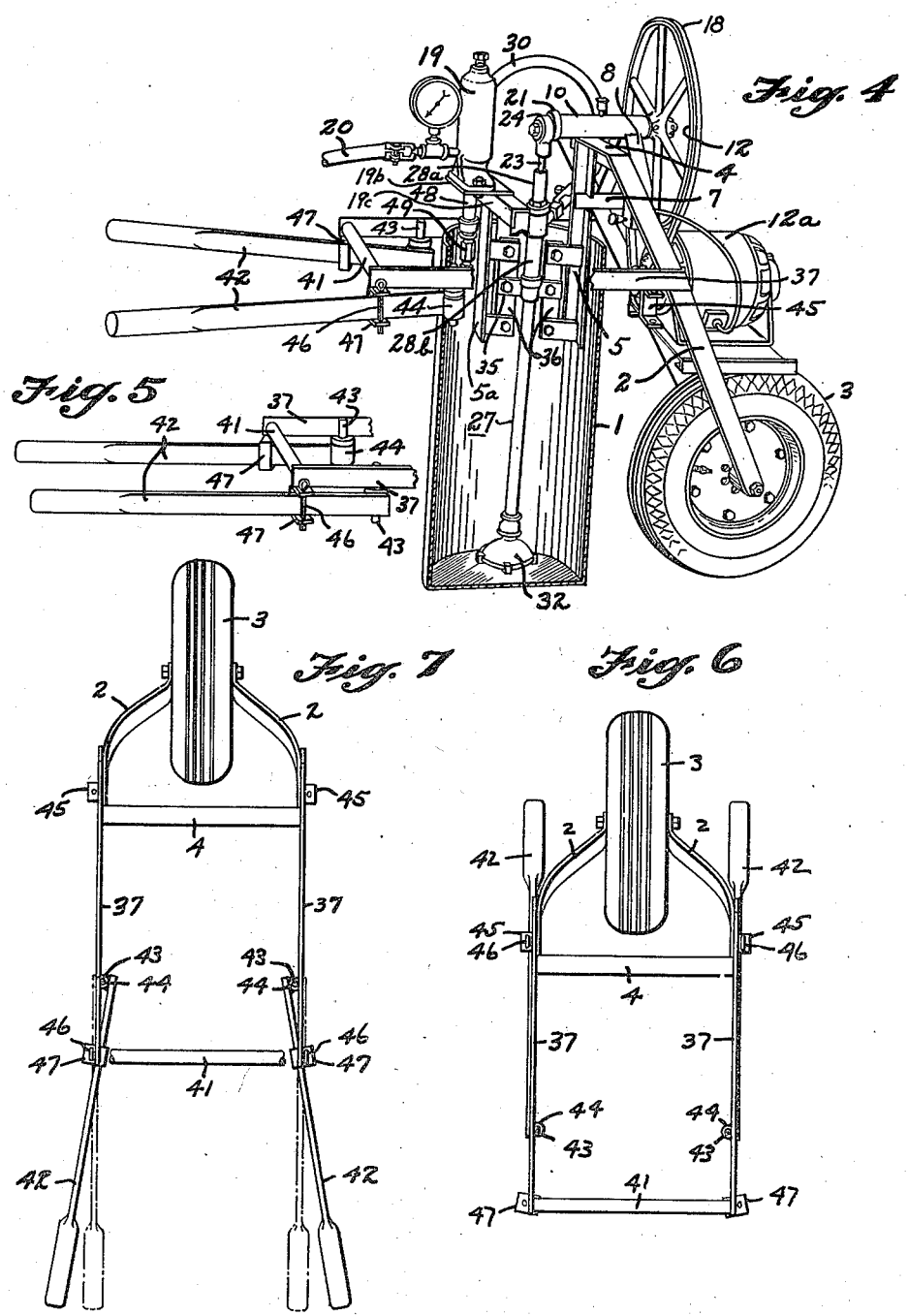
INVENTOR.
WARREN M. SPRENG
BY
ATTORNEYS Feb. 11, 1941.   W. M. SPRENG   2,231,229
SPRAYING MACHINE
Filed Sept. 12, 1938   4 Sheets-Sheet 4
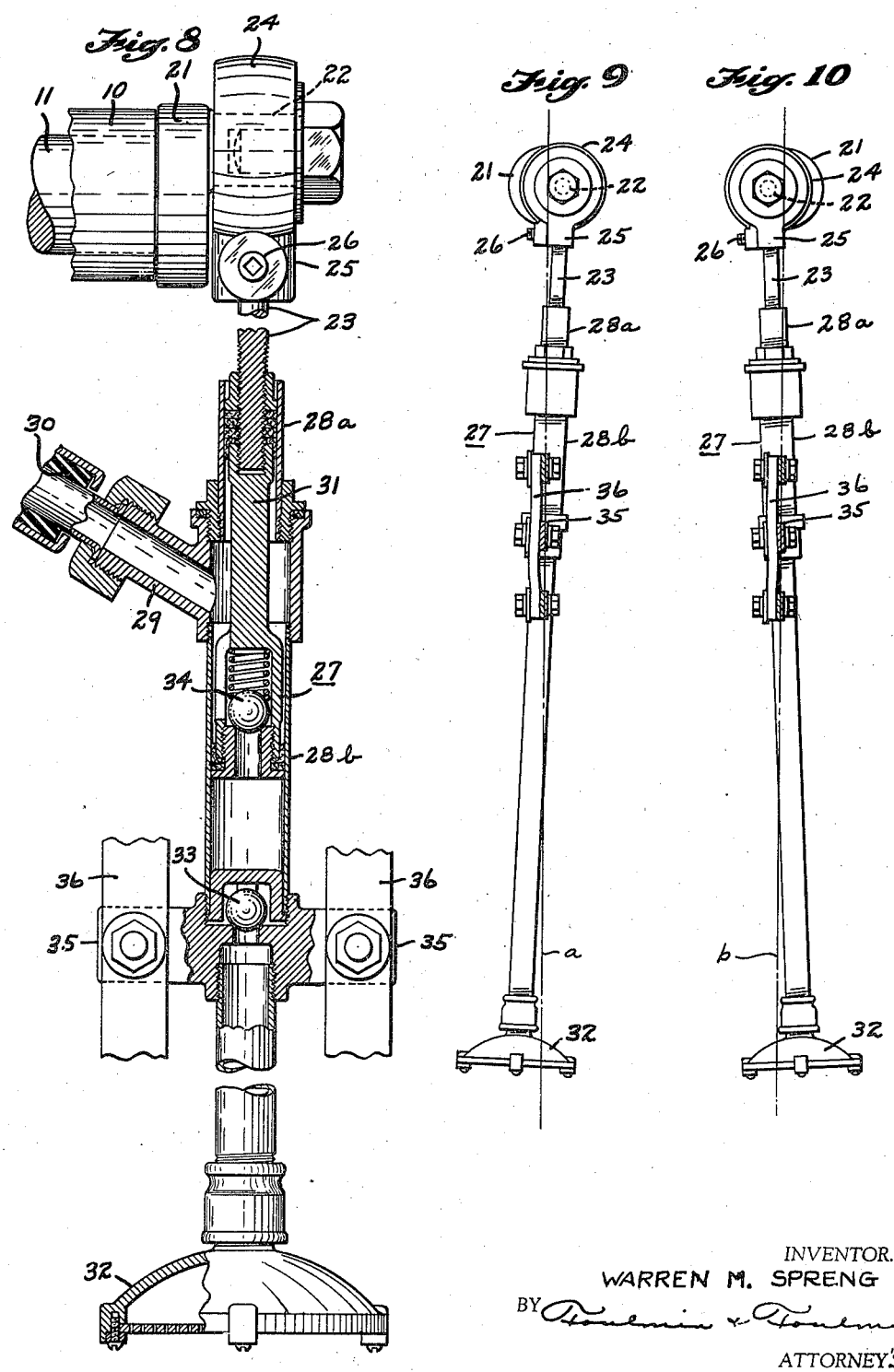
INVENTOR.
WARREN M. SPRENG
ATTORNEYS Patented Feb. 11, 1941

2,231,229

UNITED STATES PATENT OFFICE 2,231,229

SPRAYING MACHINE

Warren M. Spreng, Ashland, Ohio, assignor to The F. E. Myers & Bro. Co., Ashland, Ohio, a corporation of Ohio Application September 12, 1938, Serial No. 229,432

11 Claims. (Cl. 299—45)

This invention relates to improvements in spraying machines adapted particularly to the needs of small estates, truck gardeners and florists, in most of such uses the areas to be treated by the machine being comparatively small.

There has been a need or demand for a low-priced, small capacity power operated sprayer for such uses as just stated, including the spraying of shrubbery and flowers in private homes and on estates. The production of such a machine is an object of this invention.

It is a further object of my invention to provide a tank for containing spraying fluid, with a pump mounted therein adapted to assume agitating movements within the tank, with a power element to impart two movements to the pump, one an agitating movement and the other a pumping movement.

It is a further object of my invention to provide a tank to contain spraying liquid and a post extending into the tank, with a pump adjacent to the post and a flexible connection between the pump and the post to permit the pump to be given bodily agitating movements, and a driving shaft to actuate the pump plunger through a crank device connected with the pump plunger.

It is a further object of my invention to provide a pump mounting consisting of a frame connected to the pump, and flexible or yieldable parts which permit the frame to yield when the cylinder is agitated.

It is a further object of my invention to provide a tank for containing spraying fluid and a pump having a crank shaft connected to the plunger thereof, with a power device to actuate the pump.

It is a further object of my invention to provide a pump within a tank, the pump to be actuated by a driven crank which causes the lower portion of the pump to tip out of the vertical and stir or agitate the spraying fluid in the tank.

It is a further object of my invention to provide a pump mounted within a tank, a discharge hose connected to the pump and extending to an air chamber, and a safety valve connected with the air chamber to dispose of any excess of fluid that may accumulate in the chamber.

It is a further object of my invention to provide a supporting sleeve above the tank and to mount in that sleeve a crank shaft which may operate the plunger of the pump, and to provide a motor and a wheel mounted on said shaft and driven by the motor.

It is a further object of my invention to provide a frame having side bars, with handle bars pivoted to the side bars, the handles being capable of folding near the side bars, and also being capable of swinging on the pivots to a position to the rear of the side bars in order to make the handles spread apart, thus making it possible to use the machine when the handles are in folded position in small areas, and making it possible when the handles are extended and spread apart, to operate the machine over larger uneven surfaces, as in truck gardens.

Figure 1 is a perspective view of the entire apparatus and its adjuncts, such as its discharge hose, and its power motor, which in this instance is a gasoline engine.

Figure 2 shows a frame-like structure which in part is external to the tank and in another part is within the tank. The outer portion of the frame extends from the wheel axle to a point above the tank; and the inner portion extends down into the tank and has connection with the pump casing.

Figure 3 is an enlarged detail view of a part of the pump casing and the clamps mounted thereon and carrying resilient strips of material which function to respond to the different positions taken by the pump which result from the inclinations the pump receives when the wrist pin is rotated. See also Figures 9 and 10 where the pump casing is shown in two leaning positions.

Figure 4 is a partial vertical section and a partial perspective view of the spray tank and the mechanism when an electric motor is the power source.

Figure 5 is a perspective view of the handles extended lengthwise only, preferably for use within greenhouses where the dimensions of the machinery are more or less controlled by the size of the narrow passages through which the sprayer must be wheeled.

Figure 6 is a plan view of the barrow-like frame and wheel with the handles in folded position, that is, lined up with the horizontal frame members, for use where the machine has only to be moved short distances, as between the benches in small greenhouses, and can be operated by taking hold of the cross-bar.

Figure 7 is another plan view of the barrow-like frame and the wheel, with the handles in two positions—one shown in dotted lines for use in narrow places, as inside a greenhouse; and the other in full lines, for use in larger places, that is over cultivated ground in flower and vegetable gardens or over uneven surfaces where it is necessary to have the handles spread or flared at the outer ends in order to effectively maintain the proper balance of the machine without unnecessary effort.

Figure 8 is an enlarged view, partially in side elevation and partially in vertical section, of the pump and its several features, such as the suction strainer, the pump casing, the flexible guides, the discharge spout, the pump plunger, the connecting rod, the head of the shaft, the wrist pin therefor and the sleeve mounted in the wrist pin, and also the shaft bearing in which is mounted the pump actuating shaft.

Figure 9 is a side elevation of the pump structure and its flexible guides, with the pump structure inclined from the vertical because when the connecting rod reciprocates, the rest of the pump is moved into an incline, as the head of the shaft then tips the pump structure as the connecting rod inclines as it passes through the circle of its rotation.

Figure 10 is a like view to Figure 9, of the same parts, with the pump casing tipped out of the vertical when the connecting rod is in another position as it passes through a circular course.

Figure 11 is a detail enlarged plan view showing the handle bars spread apart in the rear as for field use.

Figure 12 is a similar view, being a detail plan view enlarged, to show the extension of the handles rearwardly but without spreading them apart.

Figure 13 is a side elevation of one form of the pump mounting.

Figure 14 is a detail sectional view of a portion of the belt pulley showing its V-groove and a cross-sectional view of the V-belt.

In the accompanying drawings, Figure 1 is a perspective view showing nearly all of the features of the machine and their relation to each other. The numeral 1 designates a tank adapted to be charged with a spraying liquid which it is desired to apply to growing plants. There are several such liquids of that character, for which reason, I do not limit the use of my apparatus to any one particular spraying fluid. As seen from Figure 1, most of the mechanism is outside of the tank.

I will first describe the frame-structure illustrated in Figure 2. The outer part of this frame is composed of a pair of bars 2 extending from the axle of the wheel 3. These portions extend upward and overhang the tank 1 and are connected by a cross-piece 4. These parts are shown in Figures 1, 2 and 4. The other portion of this frame comprises a vertical post 5 which runs down into the tank for a purpose later to appear. This post 5 is secured to the cross-piece 4 of the frame 2, and, in turn, has secured to it the brace 6 (see Fig. 13). This brace 6 is also connected to the post 5 by the cross-piece 7. A bracket 8 is connected to the bars 2 of the general frame. Mounted on the cross-piece 4 of the frame 2 is a shaft bearing 10. Within this bearing is mounted a pump actuating shaft 11. This shaft extends beyond the bracket 8 and carries a driven belt wheel 12, which is driven by a gasoline engine 13 of any desired make or type. This engine is located on a shelf 14 carried by the bars or general frame 2. The shaft 15 of the engine carries the pulley 16 preferably with a V-shaped groove 17 to receive a belt 18, V-shaped in cross-section.

The air chamber 19 is mounted in any convenient place and by any convenient means, such as being mounted, in Figures 1, 2 and 4, on the plate 19b, which in turn is supported by a beam 19c. In Figure 13, this air chamber 19 is mounted on the shaft bearing 10. This chamber carries a gauge 19a to indicate the pressure to which the fluid is subjected as it goes through the hose 20 to the plants under treatment.

I will now make reference to the pump proper and its adjuncts which are best shown in Figures 1, 2, 4 and 8. Within the shaft bearing 10 is the pump actuating shaft 11 referred to above. This shaft 11 carries an enlarged head 21, which in turn is equipped with a wrist pin 22 placed eccentrically to the center of the actuating shaft 11.

To connect the connecting rod 23 with the wrist pin, a sleeve 24 is mounted on the wrist pin 22. The sleeve 24 has a slight projection 25 into which the connecting rod 23 is inserted and held therein by a clamping bolt 26, so as to reciprocate the connecting rod.

The pump proper, and as a whole, is shown best in Figure 8, and is designated 27. It comprises a cylinder 28a and 28b and has a discharge spout 29 through which part of the pumped spraying liquid passes into the flexible tube or hose 30, on the upstroke, and through which a smaller part of the fluid passes on the downstroke of the pump plunger 31, and which fluid goes thence to the air chamber 19 and from there through the hose 20 and thence through the nozzle 20a.

On the upstroke of the plunger 31 the liquid is drawn through the suction strainer 32 up past the then lifted valve 33, and as the upward stroke of the plunger continues the fluid will pass the valve 34 and most or all of it will pass into the spout 29 and on through the hose 30 over the route mentioned above. Then when the downstroke is made, so much of the fluid as did not pass out on the upstroke will be brought down and into the spout 29 and the rest of the course of the fluid.

Referring now to the pump mounting shown in Figure 13, it will be observed that the pump casing 27 carries a cross bar 35. This crossbar, in turn, supports two spring plates or strips 36, which yield when the pump casing is inclined from the vertical as stated above. These spring elements may be constructed in various ways, but my preference is to make them of laminations of rubber and fabric, and to connect the upper and lower ends of these laminated strips to transverse yokes 35a, one end of each yoke being gripped by the post 5. The effect of this construction is to hold the upper and lower ends of each of said yokes rigid, while the crossbar 35 is free to act on the resilient strips 36 to make them bend or yield when the pump casing occupies the inclined positions to the vertical heretofore referred to. And further, the several strips or laminations are held together by several bolts for each strip, the bolts of each lamination having a washer to prevent the adjacent nut from marring or injuring the contacting lamination.

In Figure 3 I show a slight modification of the pump mounting by the addition of the supporting bar 5a and by the omission from the figures of the yokes 35a.

This pump mounting, it will be seen, is characterized by an element or elements which permit a movement of the cylinder when it is agitated by the crank action on the plunger rod.

Note that in Figure 9 the lower portion of the pump is swung to the left-hand as shown by the vertical line a; while in Figure 10 the pump proper has been swung to the right of the line b.

I shall now refer to the skeleton frame which embraces the tank, preferably at diametrical points. This frame consists of side bars 37 secured by plates 38 hung on the trunnions 39. The trunnions are secured to the tank which contains the spraying liquid. The forward end of the frame is secured as by welding to the bars 2. The rear ends of the bars 37 are joined together by a rod 41 which also forms a handle by which to manipulate the sprayer when it is in very close quarters, such as between the benches in small greenhouses.

To the steering frame bars 37, I attach extensions in the form of handles such as 42, one at either side. These handle extensions are hinged to the frame bars 37. Each of the hinges is composed of a vertical pin 43 and a sleeve 44 to which the handle bars, respectively, are preferably welded. To keep the handle in its folded position I provide two ears 45 and a cotter pin 46. By removing this cotter pin 46, the handle can be swung around to the rear to be held by another pair of ears 47, into which the same cotter pin 46 can be transferred.

The handles may be set in the position shown in Figure 7 and in Figure 11, say when it is desired to spread the handles apart to more steadily hold the machine when it is being wheeled over uneven surfaces in outside truck and flower gardens. To secure this flared position see the arrangements illustrated in Figures 6 and 7 and in Figures 11 and 12.

To the frame bars 37 there are secured the pintles or short shafts 43. On these pintles, sleeves or tubes 44 are fitted. The sleeves have projections 44a which join handle bars 42. This arrangement forms an offset which throws the forward end of the handle bars 42 inward of the frame bars 37 and allows the handle bars 42 to swing outward at an angle, so as to widen the space between these handle bars when it is desired to do so.

To secure the change of position of the handle bars 42 from that shown in Figures 6 and 12 to the position shown in Figures 7 and 11, the sleeve 44 is taken off the pintle 43, and the handle is turned over half a circle. This brings the handle from the position shown in Figures 6 and 12 to that shown in Figures 7 and 11. In this latter position the handle is secured to the frame bar 37 by a cotter pin 46 placed in the opening 47a of the rear ear 47 as seen in Figures 7 and 11.

When it is desired to place the handle bars 42 forward against the frame bars 37, all one has to do is to remove the cotter pins 46 from the rear ears 47, remove the handle bars from the pintles, turn these handle bars 42 back through the half circle referred to, place the sleeves 44 over the pintles 43 and swing the handle bars forward parallel with and slightly under the frame bars 37, until they come to rest in the forward ears 45 in which the cotter pin 46 is again placed to secure the handle bars firmly in position.

In Figure 4 an electric motor 12a, as stated above, is shown. And in Figure 1 a gasoline engine 13 is shown as the motive power. Either of these power devices may be used.

In Figure 4 of the drawings I have shown a safety valve comprising a tube 48 extending downward from the air chamber 19 and having a conventional pressure or spring valve 49. The purpose of this safety valve is that if the pressure of the fluid becomes too high, the valve will yield and permit the excess liquid to flow from the air chamber.

While I prefer to use a V-belt and a belt pulley adapted to such belt, I wish it understood that I do not confine myself to this particular type of belt and pulley.

It will be observed that this invention affords a power spraying machine in which the mechanism performs numerous useful functions. I regard these functions as being not only useful but novel.

It is understood, of course, that this invention is not limited to the exact details of construction shown, since obvious modifications may be made within the scope of this invention by persons skilled in the art.

Having thus fully described my invention, what I claim is new and desire to secure by Letters Patent, is:

1. In a spraying machine, a frame, a tank for holding spraying fluid mixture mounted on said frame, pump mechanism supported on said frame, said pump mechanism comprising a piston valve actuated suction pipe depending into said tank, said suction pipe being arranged to oscillate, and prime mover means for operating said pump to withdraw spraying fluid from said tank while simultaneously rocking the suction pipe of said pump to agitate said spraying fluid mixture.

2. In a spraying machine, a tank for containing a spraying solution, an oscillatory pump mechanism arranged in said tank, said pump mechanism comprising a piston valve actuated suction pipe, said suction pipe depending into said tank, said pump being pivotally supported, and means for operating said pump to pump spraying solution from said tank while simultaneously oscillating said pump to agitate the spraying solution in said tank.

3. In a spraying machine of the type comprising a solution containing tank, a frame for supporting said tank, a piston valve operated pump mounted thereon, said pump comprising an oscillatable suction pipe, and a prime mover mounted on said tank for actuating said pump to withdraw spraying fluid from said tank, said prime mover comprising associated mechanism including a crank and reciprocating piston rod connected to said piston for operating said pump, said pump being pivotally mounted on said frame whereupon reciprocation of said piston rod effects the oscillation of said suction pipe to stir the spraying liquid contained in said tank.

4. In a portable spraying machine of the type comprising a solution containing tank, a reciprocable piston pump means mounted in said tank, a crank driven piston rod for reciprocating said piston to operate said pump, said pump being mounted on said frame so as to rock upon reciprocation of said piston, and a prime mover carried on said frame and arranged to drive said crank.

5. In a portable spraying machine of the type comprising a solution containing tank, a frame for supporting said tank, a pump comprising a cylinder and reciprocable piston mounted therein, and suction pipe means communicating with said cylinder and depending in said tank, said pump being mounted on a yieldable means attached to said frame whereupon reciprocation of said piston results in oscillation of said pump cylinder and depending suction pipe.

6. In a spraying machine, the combination with a tank for containing spraying fluid, of a motor, a shaft driven thereby and crank means operable by said driven shaft, and pump means having a reciprocable piston rod connected to a plunger and arranged to be driven by said crank, said pump being mounted for oscillation by said crank, said pump mounting comprising yieldable means to sustain the pump in position in said tank so that it is swung back and forth during operation of said pump.

7. In a spraying machine, the combination with a tank adapted to contain spraying liquid, of a frame, a plunger reciprocable pump swingably mounted on a flexible support and fastened to said frame, and a prime mover supported on said frame and comprising a drive shaft and crank operating means drivingly connected to said plunger, said reciprocable plunger causing the pump to rock back and forth bodily to agitate said spraying liquid.

8. In a portable spraying machine of the type comprising a solution containing tank, a frame for supporting said tank, rigid means extending into said tank and fixed to said frame for supporting a pump, said pump comprising a reciprocable plunger and valve fluid control means, yieldable means for mounting said pump onto said rigid member, and prime mover means including a driven shaft and crank means connected to the plunger of said pump to cause the plunger to reciprocate oscillating said pump to bring about agitation of the spraying solution contained in said tank.

9. In a spraying machine, the combination with a tank for containing spraying liquid, of a pump and a yieldable means joining the pump to a fixed support depending in said tank, and means for operating said pump to bring about oscillation of said pump and spraying solution in said tank.

10. In a portable spraying machine of the type comprising a solution containing tank, the combination of a pump and yieldable mounting therefor with prime mover means associated therewith and drivingly connected to said pump to simultaneously pump solution from said tank and agitate the same by bodily moving said pump in said solution.

11. In a spraying machine comprising a solution containing tank, a frame, a pump mounted thereon, yieldable means for connecting said pump to said frame, suction pipe means associated with said pump and depending in said tank, and means for actuating said pump to withdraw solution from said tank and oscillate said suction pipe back and forth about an axis perpendicular to the longitudinal axis of said suction pipe.

WARREN M. SPRENG.